United States Patent Office 3,464,596
Patented Sept. 2, 1969

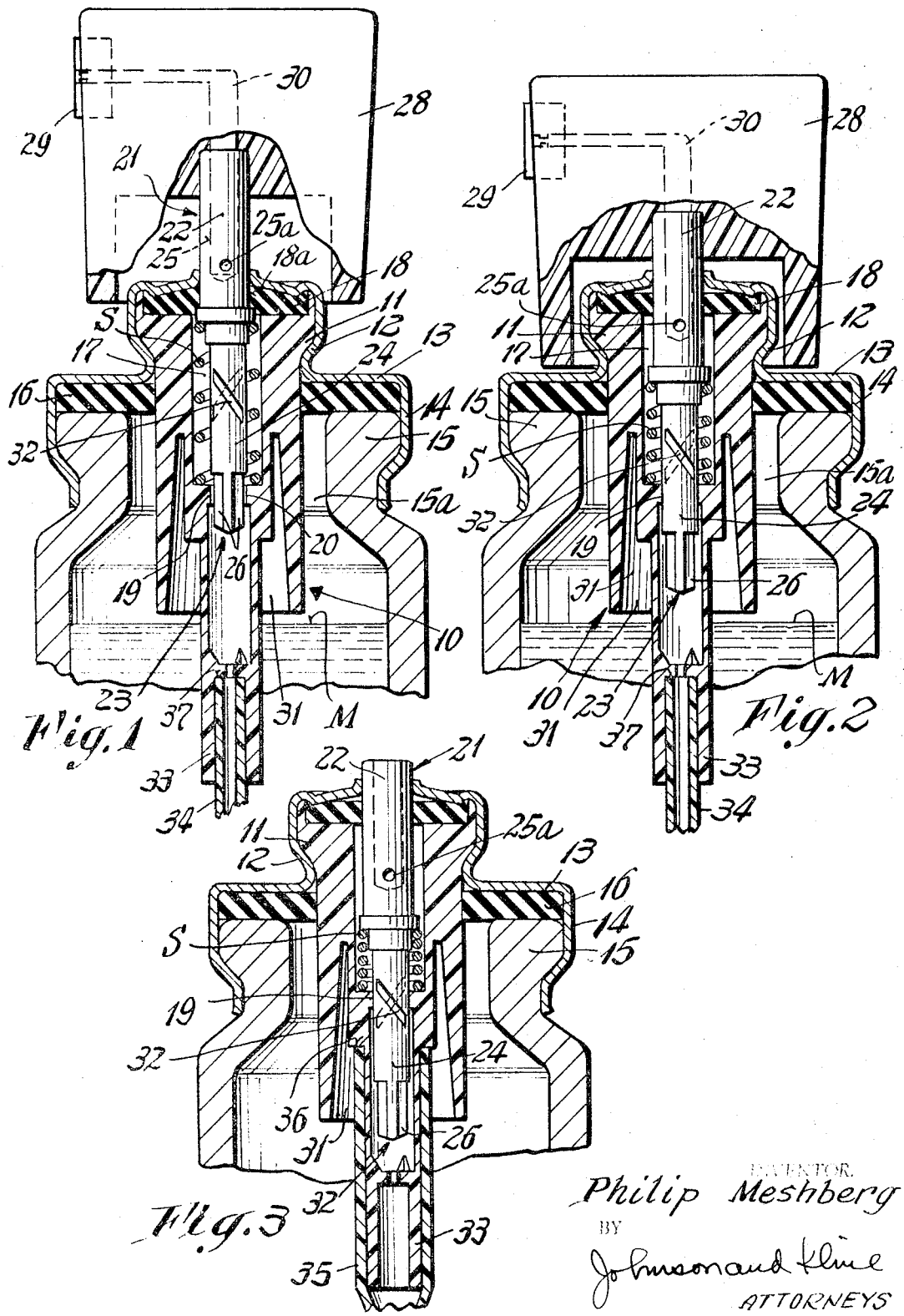

3,464,596
AEROSOL METERING VALVE
Philip Meshberg, 15 Stoneleigh Road,
Fairfield, Conn. 06430
Filed Nov. 13, 1967, Ser. No. 682,382
Int. Cl. B65d 83/14
U.S. Cl. 222—402.2                                    6 Claims

ABSTRACT OF THE DISCLOSURE

A metered valve having a tank or housing extending into the head space of a container having gas under pressure therein, the housing being made of plastic material having stiff walls forming a measuring chamber, the inner end of which is an apertured wall cooperating with a portion of the valve stem to seal off the chamber during dispensing, the wall of the housing surrounding the transverse wall being made more flexible than the remainder of the wall and flexing to maintain the transverse wall in sealing relation with the sealing portion of a reciprocating valve stem when in dispensing position under the influence of the gas under pressure in the head space. The stem, preferably of molded plastic material, has a guiding portion adjacent the sealing portion which is normally located in the aperture in the wall in non-dispensing position of the valve stem, said guiding portion being slightly smaller than the aperture to prevent binding of the stem on the apertured wall as would interfere with the movement of the stem and the applying of radial pressure to the apertured wall while preventing the stem from tilting in the housing.

---

This is an improvement on the invention shown in my U.S. Patent No. 2,721,010, which improvement provides a more economical manufacturing operation without distracting from the basic principle of the valve in metering predetermined quantities of aerosol material.

This is accomplished by providing a housing or tank of molded thermoplastic material and utilizing a molded transverse apertured sealing wall on the housing as the means cooperating with the valve stem to seal the measuring chamber formed in the housing from the material in the container. To insure the seal, the walls of the housing surrounding the transverse wall are made more flexible than those surrounding the chamber and are exposed to the gas under pressure in the head space on the container to flex slightly and maintain the seal.

Another feature of the invention is that the stem which is preferably molded of thermoplastic material has a guiding portion normally disposed in the aperture in the transverse wall in the non-dispensing position of the valve and is slightly smaller than the aperture. While this guides the stem against tilting, it will not apply any radial pressure as might tend to enlarge the opening in the plastic wall. It also eliminates any friction as might cause binding of the stem as it moves into dispensing position. The sealing portion of the stem is adjacent the guiding portion and has a diameter slightly larger than the guiding portion to sealingly engage the aperture in the transverse wall in the dispensing position of the stem and the flexi-bility of the wall surrounding the sealing portion preventing binding of the stem as it returns to the normal non-dispensing position.

A still further feature of the invention is the formation of filling the groove, preferably extending diagonally, in the stem above the sealing portion to bypass the apertured wall, when the stem is moved to a filling position, during a filling operation.

Other features and advantages of the invention will be apparent from the specification and claims when considered in connection with the accompanying drawings in which:

FIGURE 1 is a fragmentary longitudinal sectional view showing the valve in normal position.

FIG. 2 is similar to FIG. 1 showing the valve in dispensing position and

FIG. 3 is similar to FIG. 1 showing the valve in filling position.

As shown in the drawing the valve comprises a tubular tank or housing 10 molded of a thermoplastic material and having a flange or shoulder 11 adjacent its outer end cooperating with the inturned portion 12 of the mounting ferrule 13 which has a flange 14 cooperating with the end of the container 15 to lock the valve in place thereon with the housing disposed in the head space 15a of the container above the material M under pressure, which head space has gas under pressure therein. Preferably a sealing disk 16 is disposed between the ferrule and end of the container as shown in FIG. 1. The enlarged bore in the outer end of the housing forms chamber 17. The outer end of the chamber is closed by a resilient sealing member 18. The inner end of the chamber is closed by a thin transverse sealing wall 19 formed integrally, with the housing and having an aperture 20 therein to provide a measuring chamber of the required dosage or quantity. The sealing member has an aperture 18a which engages and seals a reciprocating valve stem 21 preferably of molded plastic which has a portion 22 projecting from the container, then passing through the seal 18 and along the chamber, and through the aperture 20. The stem is provided with a guide portion 23 on the end thereof and a sealing portion 24 cooperating with the transverse wall to seal the inner end of the chamber in dispensing position. The stem is normally urged to non-dispensing position by spring S as shown in FIG. 1 wherein a dispensing passage 25 having a port 25a formed in the portion 22 and located outside of the chamber 17 and the portion 23 is located in the aperture 20 in the sealing wall 19.

As shown in FIG. 1 the diameter of the stem portion 23 is slightly smaller than the aperture in the wall 19 so that it does not engage or apply radial pressure thereto in said normal position while still providing a guide to prevent tilting of the stem. Preferably this portion of the stem is provided with longitudinal passages 26 which extend above the wall and permit material to flow into the chamber in the housing from the container in said non-dispensing position.

A usual dispensing button 28 is carried by the projecting portion 22 of the stem and is provided with a nozzle 29 and passage 30 connected to the passage 25 in the stem.

When the stem is moved inwardly against spring S to the dispensing position as determined by the button engaging the end of the container and shown in FIG. 2, the port 25a in the dispensing passage is moved into the chamber and the sealing portion 24 in the stem is moved into the aperture in wall 19. It is of a slightly larger diameter than the end portion 23 so that it fills the aperture in the sealing wall to sealingly close off the chamber from the interior of the container. The difference in diameter between the sealing portion and guide portion is preferably in the range of .002″–.004″.

In the preferred form of the invention the walls of the plastic housing surrounding the chamber are stiff, so that they will not flex inwardly to vary the volume of the measuring chamber. In the form of the invention herein described, this is accomplished by making the side walls relatively thick as shown in FIG. 1. The walls of the housing surrounding the transverse sealing wall 19 however are made flexible and exposed to the gas under pressure in the head space to maintain the seal even though there might be slight dimensional variations and to return the wall to its normal position when the stem returns to non-dispensing position.

As herein illustrated, this is accomplished as shown in FIG. 1 by forming a recess 31 in the wall of the housing preferably extending inwardly from the inner end of the housing, to a point beyond the transverse wall so as to reduce the thickness of the housing wall surrounding the transverse wall 19 to increase the flexibility of the housing wall, the recess opening into the head space so as to be acted upon by the gas under pressure therein to insure the sealing relation between the stem portion 24 and apertured transverse wall 19. The flexibility of the wall, however, prevents binding of the stem in the aperture as the stem is returned to normal non-dispensing position by the spring S.

In accordance with the present invention, the stem portion 24 is provided with longitudinally disposed grooves 32, preferably diagonally arranged adjacent the sealing portion as shown in FIG. 1. Prior to the application of the button 28, the stem is moved to the filling position shown in FIG. 3 by the usual filling head (not shown) for the purpose of filling the container. In this position the grooves will bypass the sealing wall 19 so that when the material under pressure is fed from the filling head and along the passage 25 of the stem it will continue through the chamber through the grooves 32 and into the container. With the grooves diagonally arranged, the stem can move into filling position witout snagging on the transverse wall.

As shown in the drawings, the housing has an extension 33 at the inner end to receive either of two dip tubes 34, 35 of different diameters. The outer diameter of the extension will receive the larger dip tube 34 and the bore within the extension will receive the smaller diameter dip tube 35. A shoulder 36 is provided at the end of the outer surface receiving the large dip tube to limit its insertion, and a shoulder 37 is provided in the bore for engaging the inner end of the smaller dip tube and limit its insertion. The shoulder 37 will also protect the end of the tube from the pressure of the material during the filling operation so that it will be maintained in position.

The valve of the present invention since it is preferably formed of a molded housing and a molded stem is less expensive to manufacture and more economical to assemble since it requires fewer parts than the prior valves where a sealing component was needed to seal off the housing from the container. The flexible wall of the housing, under the action of the gas in the head space, will maintain sealing relation with the stem, during the dispensing operation. The end portion of the stem of reduced diameter will prevent friction or binding between the stem and the housing as the stem is moved to dispensing position and also will eliminate constant pressure on the transverse wall in the normal non-dispensing position while at the same time guiding the stem and holding it against tilting.

The diagonal grooves permit the material to bypass the wall in the filling position of FIG. 3 but will be inoperative in the normal non-dispensing position of FIG. 1 or dispensing position of FIG. 2. However, their relation on the stem prevents any catching on the transverse wall which might interfere with the movement of the stem to filling position.

I claim:

1. In a metered valve attached to a container for dispensing measured amounts of material, said container having a material under pressure therein and having a head space filled with gas under pressure, the metered valve including a tubular housing of resilient plastic material having a stiff side wall surrounding a measuring chamber formed therein, the outer end of the chamber being closed by a sealing member and an apertured inner transverse sealing wall at the inner end of the chamber, a reciprocating valve stem having a portion disposed in said apertured wall and movable from a normal outward non-dispensing position to an inward dispensing position, and means for urging said stem to normal position, the improvement wherein the portion of the side wall of the housing surrounding the said transverse sealing wall is thin and has increased flexibility and communicates with said head space and said stem having a portion slidably disposed in the aperture to sealingly fill said aperture when the stem is in dispensing position to prevent material from the container from entering the chamber and having diagonal grooves located to bypass the sealing wall when the stem is moved inward from dispensing position to a pressure filling position, said thin side walls enabling the transverse sealing wall to yield and maintain the sealing relation with the stem without causing any binding action therebetween as the means moves the stem outwardly and said pressure in the head space returning the transverse wall to normal position when the stem returns to normal nondispensing position.

2. The invention as defined in claim 1 wherein the stem has a guiding portion normally disposed in the aperture in the transverse wall when the stem is in non-dispensing position to prevent tilting of the stem, said guiding portion having a diameter slightly less than the transverse dimension of the aperture to avoid friction with and radial pressure on the transverse wall.

3. The invention as defined in claim 2 wherein the stem has a sealing portion adjacent the guiding portion, the sealing portion having a slightly larger diameter than the guiding portion to sealingly engage the apertured transverse wall when the stem is in dispensing position.

4. The invention as defined in claim 3 wherein the sealing portion has a diameter of between .002–.004″ greater than the diameter of the guiding portion.

5. The invention as defined in claim 1 wherein the housing has a recess in the side wall extending inwardly from the inner end to a point beyond the transverse wall to provide the increased flexibility.

6. In a metered valve attached to a container for dispensing measured amounts of material, said container having a material under pressure therein and having a head space filled with gas under pressure, the metered valve including a tubular housing of resilient plastic material having a stiff side wall surrounding a measuring chamber formed therein, the outer end of the chamber being closed by a sealing member and an apertured inner transverse wall at the inner end of the chamber, a reciprocating valve stem having a portion disposed in said apertured sealing wall and having an outlet port movable from a normal outward non-dispensing position to an inward dispensing position, and means for urging said stem to normal position, the improvement wherein the portion of the side wall of the housing surrounding the said transverse wall has increased flexibility and is subject to the pressure in said head space and said stem having a first guiding portion disposed in the aperture in normal position and slightly smaller than the aperture to prevent tilting of the stem and to avoid applying internal pressure to the apertured transverse wall when the stem is in normal position, a second portion provided with a diameter to sealingly fill said aperture when the stem is moved to dispensing position, said thin side walls enabling the transverse wall to yield to maintain the sealing relation with the second portion of the stem in said dispensing position and said pressure in the head space returning the transverse wall to normal position when the stem returns to non-dispensing position, and said stem having a third portion provided with diagonal grooves which bypass the sealing wall when the stem is moved inwardly of the dispensing position to a filling position.

References Cited

UNITED STATES PATENTS

| | | | |
|---|---|---|---|
| 2,858,053 | 10/1958 | Waldherr | 222—402.2 |
| 3,161,330 | 12/1964 | Sagarin et al. | 222—402.2 X |
| 3,176,887 | 4/1965 | Potapenko et al. | 222—402.2 |
| 3,235,135 | 2/1966 | Robert et al. | 222—402.2 X |

SAMUEL F. COLEMAN, Primary Examiner